Patented Jan. 18, 1949

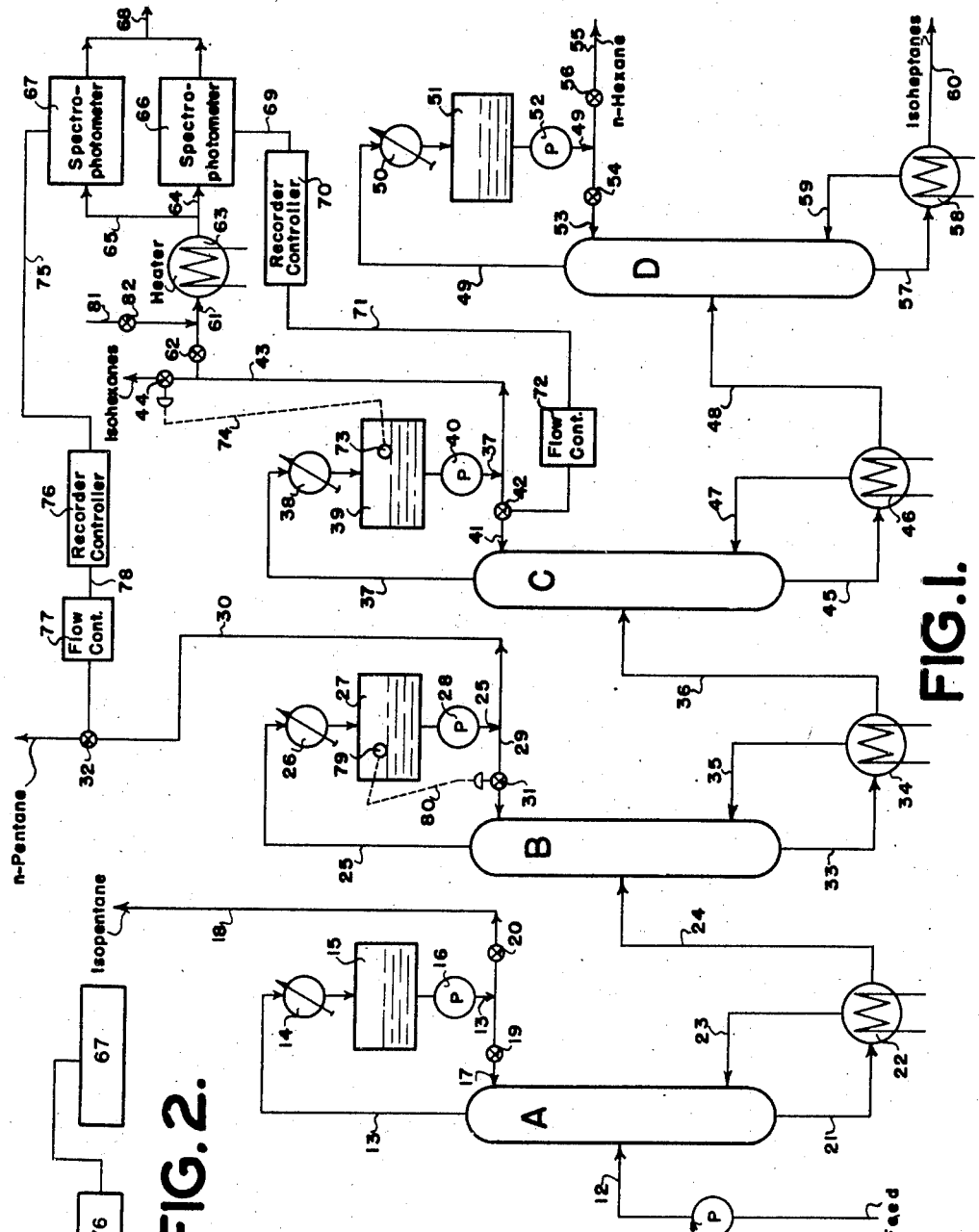

2,459,404

UNITED STATES PATENT OFFICE 2,459,404

METHOD AND APPARATUS FOR CONTROLLING MULTICOMPONENT SEPARATION PROCESS IN ACCORDANCE WITH LIGHT ABSORPTION CHARACTERISTICS

James A. Anderson, Jr., Goose Creek, Tex., assignor to Standard Oil Development Company, a corporation of Delaware Application March 15, 1946, Serial No. 654,574

8 Claims. (Cl. 202—160)

1

This invention is directed to a method and apparatus for control of process operations. More specifically, the invention is directed to a method and apparatus for continuous control of the product purity in processes involving separations of mixtures containing a plurality of components each of which has a unique absorption value for light of some specific wave length.

In the separation of organic compounds one from another, it is well known to employ fractional distillation. Separations into substantially pure components are relatively simple in laboratory scale operations when the components boil 18° F. or more apart. However, when the components boil closer together than about 18° F., the distillations become difficult to control when carried out in commercial size continuous equipment. Heretofore, it has been the usual practice to operate commercial fractional distillation towers at automatically controlled pressures and temperatures. Such operations have been fairly successful where the components being distilled had widely separated boiling points. In recent years efforts have been made to separate by fractional distillation components of a mixture boiling closer than about 18° F. As an example may be mentioned the "superfractionation" processes designed to separate the high octane number branched chain paraffin hydrocarbons from the low octane number straight chain paraffin hydrocarbons boiling below about 200° F. While relatively pure components have been successfully obtained from such processes, the separations have not been entirely efficiently made. Thus, in the commercial separation of normal pentane, boiling at about 97° F., from a mixture of isohexanes, boiling in the range of about 121° to 147° F., it has been necessary to operate under conditions such that part of the isohexanes fraction was distilled overhead with the normal pentane in order to insure that none of the latter was left in the isohexane fraction which was ultimately distilled from a residue. This efficient operation has resulted, at least in part, from the lack of a rapid and accurate method for analyzing a product stream and the resultant practice of employing the vapor temperature of the distillation process as an index of the purity of the distillate stream. Although vapor temperature is generally a satisfactory index of the purity of a distillate stream when the components of the mixture boil at widely different temperatures, it will be apparent that this index becomes less and less satisfactory as the normal boiling points of the components to be separated come closer and closer together.

2

It is one object of my invention to provide a method for controlling the purity of a product stream from a multi-stage separation process. It is another object of my invention to provide a new method and new combination of apparatus for controlling the purity of a product stream derived in the multi-stage distillation of a mixture containing a plurality of components, each of which has a unique absorption value for some specific wave length of light. Other objects and advantages of my invention will be apparent from a reading of this specification and accompanying drawing.

In accordance with one modification of my invention, a charge stock is fed to a first separation zone where a first component or product stream is separated from higher boiling components. A portion of this first product stream is returned as reflux to the separation zone. The residue from the first separation zone is charged to a second separation zone where a second component or product stream is separated from a third component. A portion of this second product stream is also returned as reflux to the second separation zone. A minor quantity of the second product stream is vaporized and divided into two portions. Each vaporized portion is passed through the sample cell in different spectrophotometers in which vaporous samples are exposed to predetermined monochromatic wave lengths of light, which wave lengths have been selected according to the unique absorption characteristics of the first and third components mentioned above. The unabsorbed light passing through each of the cells in the spectrophotometers is converted to an electrical potential by well known means, such as a thermopile in the case where infrared light is employed with the spectrophotometer, or a photoelectric cell in the case where ultra violet light is employed. The electrical potentials derived from each of the spectrophotometers are amplified and impressed upon separate recorder-controllers of well known design. The recorder-controllers, in turn, operate flow-controllers, also of well known design, which control the rate of flow of particular streams in each of the separation zones.

The present invention will now be described with reference to the accompanying drawing in which:

Fig. 1 is in the form of a schematic flow plan; and

Fig. 2 is a fragmentary view illustrating an alternative procedure for practicing the present invention.

Turning now specifically to the drawing and first to Fig. 1, this figure represents a multi-stage fractional distillation process. For purposes of description it will be assumed that this process involves the distillation of a crude petroleum naphtha, boiling in the range from about 80° F. to 200° F., in order to separate normal pentane and normal hexane from the high octane number isopentane, isohexanes and isoheptanes.

Referring to the drawing, the letters A, B, C and D designate fractional distillation towers, each provided with bell cap plates (not shown), or other similar packing. Each tower is preferably provided also with automatic means conventional to the distillation art for controlling the pressure therein and the feed rate thereto and/or the residue withdrawal rate therefrom. A mixture of normal paraffin and isoparaffin hydrocarbons is forced by pump 11 through conduit 12 into fractional distillation tower A. Vapors containing predominantly isopentane are withdrawn from tower A through conduit 13 and are condensed in cooling means 14. Condensate from condensing means 14 is accumulated in vessel 15 from whence a portion is forced by pump 16 through conduit 17 as reflux for tower A, while a second portion is caused to be withdrawn through conduit 18. Conduits 17 and 18 may contain, respectively, valves 19 and 20, which may be operated in a manner that will be mentioned hereinafter. During the distillation, components heavier than isopentane are caused to pass downward through tower A and are withdrawn through conduit 21 into heating means 22. In heating means 22 these components are reboiled and the resulting vapors are returned into distillation tower A through conduit 23. The unvaporized components from heating means 22 pass through conduit 24 into tower B.

As a result either of lower pressure or higher temperature in tower B as compared with tower A, vapors containing predominantly normal pentane are caused to rise through tower B and are withdrawn through conduit 25. These normal pentane vapors are condensed in cooling means 26 and the condensed liquid is accumulated in vessel 27. One portion of the condensed pentane is forced by pump 28 through conduit 29 as reflux to tower B while another portion is forced through conduit 30. Conduits 29 and 30 are controlled by valves 31 and 32, respectively, which may be operated in a manner that will be discussed more fully hereinafter. Components boiling higher than normal pentane pass downward through tower B and are withdrawn through conduit 33 into heating means 34 where they are reboiled and vapors therefrom returned to tower B through conduit 35. Unvaporized components from heating means 34 pass through conduit 36 into fractional distillation tower C.

Again, as a result either of reduced pressure or increased temperature in tower C as compared to tower B, a mixture of isohexanes boiling up to about 140° F. is vaporized and caused to pass through conduit 37 into cooling means 38 and thence into vessel 39. A portion of the condensed isohexanes is forced by pump 40 to return through conduit 41 controlled by valve 42 as reflux to distillation tower C, while the remainder of the liquid is forced through conduit 43 controlled by valve 44.

As in towers A and B, the heavier components in tower C pass downwardly therethrough and are withdrawn through conduit 45 into heating means 46 where these fractions are reboiled and the vapors returned through conduit 47 into tower C. The residue from tower C, comprising predominantly normal hexane and a mixture of isoheptanes, passes through conduit 48 into tower D and the normal hexane contained therein is vaporized and passes therefrom through conduit 49 and cooling means 50 into vessel 51. One portion of the condensate in vessel 51 is forced by pump 52 to return as reflux to tower D through conduit 53 controlled by valve 54, while a second portion of the condensate is withdrawn from the process through conduit 55 controlled by valve 56. The heavy fractions comprising substantially a mixture of isoheptanes having boiling points ranging from about 174° to about 200° F. pass downward through tower D and are withdrawn through conduit 57 into reboiling means 58 from whence vapors pass through conduit 59 into tower D and unvaporized components are withdrawn through conduit 60.

The operation thus far described is well known in the distillation art. In accordance with my invention, a small portion of the product from one of the intermediate distillation towers such, for example, as the product withdrawn through conduit 43 is continuously taken off through a sample line 61 controlled by valve 62 and is preferably passed through a heating means 63, and manifolded conduits 64 and 65 into the sample cells (not shown) in spectrophotometers 66 and 67. These spectrophotometers are shown in the drawing simply as rectangles; the details of the construction of suitable spectrophotometers and the sample cells used therein are well known in the art. Suitable spectrophotometers and their method of operation are disclosed in an article entitled "Infrared spectroscopy, industrial applications," by Barnes, Liddell and Williams, Industrial and Engineering Chemistry (Analytical Edition), vol. 15, No. 11, pages 659–709. A showing of the construction details of the spectrophotometer is omitted from the drawing in the present application in order to simplify the description. It is to be understood that the term "spectrophotometer" as used herein shall include a suitable source of light, means for selecting a mono-chromatic light beam of desired wave length, a suitable sample cell, means for quantitatively converting into an electrical potential the light energy transmitted through the sample cell, and such amplification means as is necessary to amplify the electrical potential to such value that a conventional type recorder may be operated therefrom.

After passing through the sample cells within spectrophotometers 66 and 67, the vaporous sample may be continuously withdrawn through a manifolded conduit 68 and may be returned to conduit 43 or be disposed of as desired.

As is well known in the art of spectrophotometry, when a pure compound is interposed in the path of a monochromatic beam of light, a certain proportion of the light energy is absorbed so that only a fraction of the light energy passed into the cell containing the compound is transmitted as compared to the amount of energy for the same wave length of light passed into an identical cell containing no compound. Furthermore, when any given compound is exposed to different wave lengths of light and the amount of light absorbed by the compound is measured, it is generally possible to find a wave length at which the given compound has a uniquely higher absorption than has any other compound which may be present with it.

In accordance with the present invention, and more particularly with the example used for the purpose of this description, the means for selecting a mono-chromatic beam of light in spectrophotometer 66 is adjusted to pass into the sample cell contained therein a wave length of light for which normal hexane has a unique high absorption characteristic. A desirable wave length may be 13.8 microns. A portion of this light will be absorbed by any normal hexane which may be present in the vaporized sample withdrawn from conduit 43. Another but considerably smaller portion will be absorbed by other components of the sample, while the remainder of the light will be transmitted through the sample. Accordingly, when the concentration of normal hexane in this stream is very small, a large proportion of the light of this specific wave length passed into the sample cell will be transmitted therethrough and will be converted into a relatively large electrical potential by the light detecting device within the spectrophotometer. If for any reason the concentration of normal hexane should increase in the liquid passing through conduit 43 the amount of light absorbed by the normal hexane vapors will increase and the electrical potential developed by the detecting device will decrease. The above mentioned electrical potentials are transmitted by electrical conductors 69 from spectrophotometer 66 to a recorder-controller 70. This controller is shown in the drawing as a simple rectangle to simplify description in the present application. Suitable recorder-controllers to convert the electrical potential into mechanical movement or displacement are illustrated by controllers such as the Brown electronic continuous balance potentiometer controller, in which an incoming D. C. signal is converted to an A. C. signal by a vibrator and is amplified electronically. The amplified signal is then caused to drive a reversible motor whose shaft is mechanically connected to a recording pen and potentiometer slide wire. The output of the potentiometer is applied in opposition to the D. C. signal from the analyzer so that any difference between the potentiometer and analyzer signals will be amplified and cause a rotation of the motor to bring the potentiometer and the analyzer signals into exact balance.

In this way, the recorder-controllers record a deflection which is dependent upon the absorption of light by the sample. The mechanical movement produced in the recorder-controller is arranged to change the position of a "flapper and nozzle" arrangement well known in the instrument art for operating, through compressed air line 71, a flow controller 72 which in turn operates valve 42 in conduit 41. Flow controller 72 also is shown in the drawing as a rectangle to simplify description in the present application. A conventional flow controller which may be employed in the practice of my invention is described in "Industrial Instruments for Measurement and Control," by Rhodes, published by McGraw-Hill Book Co., Inc., first edition, 1941, page 489. This reference describes an air-operated ful range throttling controller.

In the operation of tower C in a process illustrated by the present example, it is desired to withdraw through conduit 43 a mixture of iso-hexanes containing no normal hexane. In accordance with the present invention if a small quantity of normal hexane should appear in the liquid flowing through this conduit, it would be promptly detected in spectophotometer 66 which would automatically cause flow controller 72 to open valve 42 and thereby increase the rate of reflux to tower C. This increase in the rate of reflux would soon eliminate from the top of tower C any normal hexane vapors which passed upward through that tower. Conversely, if no normal hexane were present in the liquid passing through conduit 43, this fact would be detected by spectrophotometer 66 which in turn can be adjusted to cause flow controller 72 to close down on valve 42 thereby reducing the rate of return of reflux liquid to the tower.

In order to prevent flooding of vessel 39 when valve 42 is at least partially closed, a float 73 in vessel 39 is employed to operate valve 44 in conduit 43 through means 74. Thus when valve 42 is at least partially closed, the liquid level in vessel 39 tends to rise. This rise raises float 73 which in turn causes valve 44 to open and permit the liquid in vessel 39 to return to a predetermined level.

In accordance with the present invention, it is also desirable that the liquid flowing through conduit 43 should contain no normal pentane. Accordingly, spectrophotometer 67 is operated with a wave length of light for which normal pentane has a unique high absorption characteristic. A suitable wave length may be 10.0 microns. In all other respects, spectrophotometer 67 is operated identical to spectrophotometer 66 and the electrical potential developed therein is transmitted by electrical conductors 75 to recorder-controller 76 which is substantially identical to recorder-controller 70. Similarly, recorder-controller 76 operates flow-controller 77 through conduit 78. Controller 77 is arranged to open valve 32 when normal pentane is detected by spectrophotometer 67.

To prevent flooding of vessel 27 when valve 32 is at least partially closed, vessel 27 is provided with a float 79 which is connected through means 80 arranged to open valve 31 as the liquid level in vessel 27 rises.

Instead of causing valve 32 to open and close as the concentration of normal pentane appearing in the liquid passing through conduit 43 increases or decreases, spectrophotometer 67 may be connected through recorder-controller 76 and flow controller 77 to a valve arranged to adjust the heat input in the bottom of tower B. Such a modification is illustrated by Fig. 2.

In this figure tower B' corresponds to indicator B of Fig. 1 except that a reboiler or heat exchanger 81 supplies heat to the bottom of the tower. Unit 81 is illustrated as being in the form of a coil through which a suitable heating fluid may pass, the flow being controlled by valve 82. In this embodiment spectrophotometer 67 is connected through recorder controller 76 and flow controller 77 to valve 82 which is arranged to alter the amount of fluid and thereby the heat supplied to the bottom of tower B' through coil 81.

Although the control of the purity of the iso-hexane stream passing through conduit 43 has been particularly described, it will become apparent to one skilled in the art that similar spectrophotometers and controlling instruments may be similarly applied to other intermediate streams in a multistage distillation process. Thus, a pair of spectrophotometers may be arranged to analyze portions of samples withdrawn from conduits 30 and 55. In the former case one spectrophotometer would be operated on a wave length of light, suitably 8.3 microns, for which one of the low boiling isomers of hexane (such as 2,2- dimethylbutane) has a unique absorption characteristic in the presence of other components likely to be present in the sample. The recorder-controller and flow-controller associated with this spectrophotometer would be employed to operate valve 31 in conduit 29 or another valve placed in the same conduit. The second spectrophotometer would be operated on a wave length of light, suitably 10.3 microns, for which isopentane has a unique absorption characteristic in the presence of other components likely to be present in the stream. The recorder-controller and flow-controller associated with this spectrophotometer would then operate valve 20 or, alternatively, a means controlling the heat input to heating means 22.

When the spectrophotometers are connected to conduit 55 as the source of sample, one spectrophotometer would be operated on a wave length of light, suitably 10.15 microns, for which a high boiling isomer (such as 3, methyl pentane) has a unique absorption characteristic in the presence of other components likely to be present in the stream, and the associated recorder-controller and flow-controller would actuate valve 44 or another control valve in conduit 43 downstream from its juncture with conduit 61. The second spectrophotometer similarly would be operated on a wave length of light, for example 8.3 microns, for which a low boiling isoheptane (such as 2,2 dimethyl pentane) has a unique absorption characteristic. Valves 54 and 56 would then be operated in the manner already described for valves 42 and 44.

Since the stability of spectrophotometers 66 and 67 may vary slightly from time to time and since components other than the specific "key" components having unique light absorption characteristics at the specific wave lengths employed in these instruments also absorb some of the light, it is desirable that these instruments should be restandardized at intervals. Conveniently this may be done by segregating in a vessel (not shown) a small quantity of product from conduit 43 when this product uniformly meets required specifications. At desired intervals this specification grade product may be introduced through conduit 81 by opening valve 82 therein and closing valve 62. While the specification product is passing through the spectrophotometers, the amplifiers or the recorder-controllers associated with the spectrophotometers may be adjusted to correct for the instability of the spectrophotometers and to cause flow controllers 72 and 77 to close down or open up in accordance with the previously described method. Since these readjustments are relatively simple and not time consuming, the spectrophotometers may maintain substantially continuous control of a process operation.

It will be evident to one skilled in the art that my invention is not limited to control of the distillation of paraffin hydrocarbons; it is applicable to the control of multi-stage solvent extraction and/or distillation separations of any components each of which has a unique absorption characteristic for some wave length of light. In general this includes all organic and some inorganic compounds, as for example aqueous solutions of potassium nitrate. It is within the scope of my invention to employ any suitable type of spectrophotometer, such as an infrared or an ultra violet spectrophotometer, depending on the nature of the component which is to be analyzed. Thus, in the case where one of the critical components to be separated from a product stream is an aromatic compound while another critical component is a paraffin, it may be desirable to analyze a particular stream with a spectrophotometer operated by ultra violet light, while the other spectrophotometer analyzing the same stream may be an infrared spectrophotometer.

While specific wave lengths of light have been mentioned herein for purposes of illustration, it will be understood by those skilled in the art that my invention is not limited to the utilization of these specific wave lengths. The choice of wave lengths of light to be employed will depend upon the key components to be separated and upon the components from which the key components are to be separated. The method of selecting suitable wave lengths is well known to persons skilled in the art of spectrophotometry.

Having fully described and illustrated the practice of the present invention, what I wish to claim as new and useful and to secure by Letters Patent is:

1. In a process involving at least a first stage and a second stage in which a feed stream comprising at least three components is separated to obtain at least first, second, and third successive product streams the predominant component of each of which streams has a unique absorption characteristic for different wave lengths of light, the steps of continuously analyzing at least said second product stream and obtaining therefrom at least two electrical potentials, the first of said potentials being a function of a unique light absorption characteristic at a predetermined wave length of light for the predominant component in said first product stream and the second of said potentials being a function of a unique light absorption characteristic at a different predetermined wave length of light for the predominant component in said third product stream, employing said first potential to control the first stage and said second potential to control the second stage in the process of separating said feed stream into said product streams.

2. In an apparatus involving a plurality of zones adapted to separate a feed stream comprising at least three components into at least first, second, and third successive product streams the predominant component of each of which streams has a unique absorption characteristic for different wave lengths of light, the combination of elements comprising means for continuously analyzing at least said second product stream and obtaining therefrom at least a first electrical potential which is a function of a unique light absorption characteristic at a predetermined wave length of light for the predominant component in said first product stream and a second potential which is a function of a unique light absorption characteristic at a different predetermined wave length of light for the predominant component in said third product stream, means impelled by said first potential for controlling a product stream in a first zone, and means impelled by said second potential for controlling a product stream in a second zone of said apparatus.

3. A method for controlling the purity of a product stream in a multi-stage distillation process which comprises feeding to a multi-stage distillation process a mixture comprising at least three components of successively higher boiling points, each of said components having a unique absorption characteristic for different wave lengths of light, continuously distilling said feed stream and separating from at least two successive stages of said process at least three product streams having low, intermediate and high boiling points relative to each other, continuously analyzing at least the intermediate of said product streams, obtaining from said analysis at least two electrical potentials, the first of said potentials being a function of a unique light absorption characteristic at a predetermined wave length of light for the predominant component in said low boiling product stream and the second of said potentials being a function of a unique light absorption characteristic at a different predetermined wave length of light for the predominant component in said high boiling product stream, employing the first of said potentials to control the first of said two successive stages and employing the second of said potentials to control the second of said two successive stages in the process of separating said feed stream into said product streams.

4. A method in accordance with claim 3 in which the first of said potentials is employed to control the rate of product withdrawal of said low boiling product stream and the second of said potentials is employed to control the rate of reflux addition to the stage producing said intermediate boiling product stream.

5. A method in accordance with claim 3 in which the first of said potentials is employed to control the ebullition rate in the first of said two successive stages and the second of said potentials is employed to control the rate of reflux addition to the second of said two successive stages.

6. An apparatus in accordance with claim 2 in which the means for continuously analyzing said second product stream and obtaining therefrom said electrical potentials are spectrophotometers.

7. An apparatus in accordance with claim 2 in which the means for continuously analyzing said second product stream and obtaining therefrom said electrical potentials are spectrophotometers employing infrared light wave lengths.

8. An apparatus in accordance with claim 2 in which the means for continuously analyzing said second product stream and obtaining therefrom said electrical potentials are spectrophotometers employing ultra violet light wave lengths.

JAMES A. ANDERSON, JR.

REFERENCES CITED

The following references are of record in the file of this patent:

UNITED STATES PATENTS

| Number | Name | Date |
| --- | --- | --- |
| 2,386,830 | Wright | Oct. 16, 1945 |
| 2,386,831 | Wright | Oct. 16, 1945 |